(12) United States Patent
Koshy

(10) Patent No.: US 11,667,241 B2
(45) Date of Patent: Jun. 6, 2023

(54) FOLDABLE GUARDRAIL ASSEMBLY FOR SELECTIVELY FACILITATING ACCESS TO A MACHINE COMPONENT

(71) Applicant: Caterpillar Underground Mining Pty. ltd., South Burnie (AU)

(72) Inventor: Sunil Koshy, Burnie (AU)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 500 days.

(21) Appl. No.: 16/863,778

(22) Filed: Apr. 30, 2020

(65) Prior Publication Data
US 2020/0361387 A1 Nov. 19, 2020

(30) Foreign Application Priority Data
May 14, 2019 (AU) ................................ 2019203354

(51) Int. Cl.
*B60R 3/00* (2006.01)
(52) U.S. Cl.
CPC ..................................... *B60R 3/005* (2013.01)
(58) Field of Classification Search
CPC ............ B60R 3/005; B60R 3/007; B60R 3/02
See application file for complete search history.

(56) References Cited

U.S. PATENT DOCUMENTS

| | | | | |
|---|---|---|---|---|
| 5,203,425 A * | 4/1993 | Wehmeyer | ............... | B66F 11/04 182/148 |
| 5,749,436 A * | 5/1998 | Satchwell, III | ......... | B60R 3/005 211/195 |
| 5,921,531 A * | 7/1999 | Early | ...................... | B60R 3/005 105/457 |
| 5,967,258 A * | 10/1999 | Scott | ....................... | B60R 3/005 182/112 |
| 6,045,157 A * | 4/2000 | Poulin | ..................... | B60R 3/005 280/830 |
| 9,487,145 B2 * | 11/2016 | Koshy | .................. | E02F 9/0833 |
| 10,286,846 B1 * | 5/2019 | Lindholm | ............. | E02F 9/0833 |
| 10,648,235 B2 * | 5/2020 | Cook | ........................ | E04G 5/10 |

(Continued)

FOREIGN PATENT DOCUMENTS

| | | |
|---|---|---|
| CN | 108385763 A | 8/2018 |
| JP | 2013049566 A | 3/2013 |

(Continued)

*Primary Examiner* — Jeffrey J Restifo
(74) *Attorney, Agent, or Firm* — von Briesen & Roper, s.c.

(57) ABSTRACT

A foldable guardrail assembly is provided for selectively facilitating access to a machine component located onboard a vehicle. The vehicle has a platform with a handrail disposed thereon and located adjacent to the machine component. The guardrail assembly includes a set of guardrails pivotally connected to each other in a successive manner via at least a corresponding number of hinge assemblies. A first one of the guardrails is pivotally connected to an upright portion of the handrail via a first hinge assembly. The guardrail assembly further includes a first latch assembly provided, at least in part, on a last one of the guardrails. The first latch assembly is configured to releasably secure the last one of the guardrails to the platform when the guardrails operably move into in a fully unfolded position, via the hinge assemblies, for providing access to the machine component located onboard the platform.

19 Claims, 6 Drawing Sheets

(56) References Cited

U.S. PATENT DOCUMENTS

| | | | |
|---|---|---|---|
| 11,007,944 B1* | 5/2021 | Hanser | E04G 5/14 |
| 11,130,448 B2* | 9/2021 | Bares | B60R 3/02 |
| 2003/0020253 A1* | 1/2003 | Albert Bosman | B60R 3/005 |
| | | | 280/164.1 |
| 2008/0122211 A1* | 5/2008 | Kang | B60R 3/005 |
| | | | 280/762 |
| 2014/0217345 A1* | 8/2014 | Stoffels | B60R 3/005 |
| | | | 256/64 |
| 2014/0353083 A1* | 12/2014 | Samuel | B60R 3/005 |
| | | | 182/87 |
| 2015/0060202 A1* | 3/2015 | Fanello | B60R 3/005 |
| | | | 182/113 |
| 2015/0246641 A1* | 9/2015 | Jayapalan | B60R 3/005 |
| | | | 182/113 |
| 2015/0246643 A1* | 9/2015 | Levi | B60R 9/045 |
| | | | 182/113 |
| 2015/0291100 A1* | 10/2015 | Koshy | E04H 12/2269 |
| | | | 280/727 |
| 2015/0291101 A1* | 10/2015 | Koshy | E02F 9/0833 |
| | | | 280/727 |
| 2016/0311376 A1* | 10/2016 | Dokter | B60P 3/224 |
| 2017/0130425 A1* | 5/2017 | Kim | B60R 3/005 |
| 2017/0144603 A1* | 5/2017 | Matthiesen | B60R 3/02 |
| 2017/0190293 A1* | 7/2017 | Koga | E02F 9/16 |
| 2017/0313255 A1* | 11/2017 | Brett | E04G 5/14 |
| 2018/0148906 A1* | 5/2018 | Magnussen | E06C 5/02 |
| 2018/0266075 A1* | 9/2018 | Miyamoto | B66C 13/52 |
| 2018/0272951 A1* | 9/2018 | Oliver | B60R 3/005 |
| 2019/0085532 A1* | 3/2019 | Satou | B60R 1/06 |
| 2019/0135185 A1* | 5/2019 | Oliver | B60R 3/005 |
| 2019/0143902 A1* | 5/2019 | Schwalbe | B60R 3/005 |
| | | | 182/113 |
| 2019/0352920 A1* | 11/2019 | Salyer | E04G 5/007 |
| 2020/0361387 A1* | 11/2020 | Koshy | B60R 3/005 |
| 2021/0070223 A1* | 3/2021 | Oliver | B60R 3/005 |
| 2021/0178973 A1* | 6/2021 | Moen | B60R 3/005 |

FOREIGN PATENT DOCUMENTS

| | | |
|---|---|---|
| JP | 2016176292 A | 10/2016 |
| JP | 2016204879 | 12/2016 |
| WO | WO 2015/178511 A1 | 11/2015 |

* cited by examiner

FOLDABLE GUARDRAIL ASSEMBLY FOR SELECTIVELY FACILITATING ACCESS TO A MACHINE COMPONENT

CROSS-REFERENCE TO RELATED APPLICATION

This application claims priority under 35 USC § 119 and the Paris Convention to Australian Patent Application No, 2019203354 filed on May 14, 2019.

TECHNICAL FIELD

The present disclosure relates to a work machine having a platform and a machine component located onboard the platform. More particularly, the present disclosure relates to a foldable guardrail assembly for selectively facilitating access to a machine component located onboard a platform of a work machine.

BACKGROUND

Work machines such as, but not limited to, earthmoving machines typically include a platform for mounting several machine components thereon. Some of these components may include, but are not limited to, one or more air filter/s, fluid pump/s, fan/s, light/s, compressor/s and other system associated hardware. The platform may also be configured to allow maintenance personnel onboard for accessing such components, for instance, during service routines to inspect, overhaul or replace one or more components, or may even be configured to allow navigation personnel to climb onboard the platform and help a cabin operator in navigating, that is, directing a movement of the machine.

Regardless of whether the work machine may be moving or stationary, presence of personnel onboard the platform of the work machine may pose challenges to the safety of the onboard personnel. In many cases, owing to poor system design, for example, if the platform is inadequately sized, or in cases where the platform lacks a structural barrier for guarding personnel onboard the platform, personnel may be susceptible to injury from falling off the platform.

U.S. Publication 2018/0148906 (hereinafter referred to as 'the '906 reference) discloses a safety barrier for a walkway of an excavating machine embodied in the form of a bulldozer. However, as the '906 reference discloses the implementation and use of the safety barrier in conjunction with a specific type of machine i.e., the bulldozer, the safety barrier of the '906 reference is limited to its implementation and use on that specific type of machine alone. Other types of machines may be configured to have platforms at locations different from that typically found on a bulldozer. In addition, the platforms may vary in size and/or shape and locations of entry and exit points on each platform may vary from one machine make, type and/or model to another. Moreover, the safety barrier of the '906 reference is not designed to intuitively prevent maintenance personnel from removing or installing certain machine components, for example, air filter/s that may be bulky and/or heavy, thereby continuing to expose maintenance personnel to the risk of falling off from the platform in tandem with the machine components during service routines.

Hence, there is a need for an improved safety barrier that overcomes the aforementioned drawbacks.

Reference to any prior art in the specification is not an acknowledgment or suggestion that this prior art forms part of the common general knowledge in any jurisdiction or that this prior art could reasonable be expected to be understood, regarded as relevant, and/or combined with other pieces of prior art by a skilled person in the art.

As used herein, except where the context requires otherwise the term 'comprise' and variations of the term, such as 'comprising', 'comprises' and 'comprised', are not intended to exclude other additives, components, integers or steps.

SUMMARY OF THE DISCLOSURE

In an aspect of the present disclosure, a foldable guardrail assembly is provided for selectively facilitating access to a machine component located onboard a work machine. The work machine has a platform with a handrail disposed thereon and located adjacent to the machine component. The foldable guardrail assembly includes a set of guardrails pivotally connected to each other in a successive manner via at least a corresponding number of hinge assemblies. A first one of the guardrails is pivotally connected to an upright portion of the handrail via a first hinge assembly. The guardrail assembly further includes a first latch assembly provided, at least in part, on a last one of the guardrails. The first latch assembly is configured to releasably secure the last one of guardrails to the platform when the guardrails operably move into in a fully unfolded position, via the hinge assemblies, for providing access to the machine component located onboard the platform.

In another aspect of the present disclosure, a work machine includes a platform, a machine component located onboard the platform, and a handrail disposed on the platform and located adjacent to the machine component. The work machine further includes a foldable guardrail assembly coupled to the handrail. The foldable guardrail assembly is operable to selectively facilitate access to the machine component. The guardrail assembly includes a set of guardrails pivotally connected to each other in a successive manner via at least a corresponding number of hinge assemblies. A first one of the guardrails is pivotally connected to an upright portion of the handrail via a first hinge assembly. Further, the guardrail assembly also includes a first latch assembly provided, at least in part, on a last one of the guardrails. The first latch assembly is configured to releasably secure the last one of guardrails to the platform when the guardrails operably move into in a fully unfolded position, via the hinge assemblies, for providing access to the machine component located onboard the platform. Furthermore, the guardrail assembly also includes a second latch assembly provided, at least in part, on a pre-selected one of the guardrails. The second latch assembly is configured to releasably secure the guardrails to the handrail when the guardrails operably move into in a fully folded position, via the hinge assemblies, for preventing access to the machine component located onboard the platform.

Other features and aspects of this disclosure will be apparent from the following description and the accompanying drawings.

DETAILED DESCRIPTION

Figure 1:
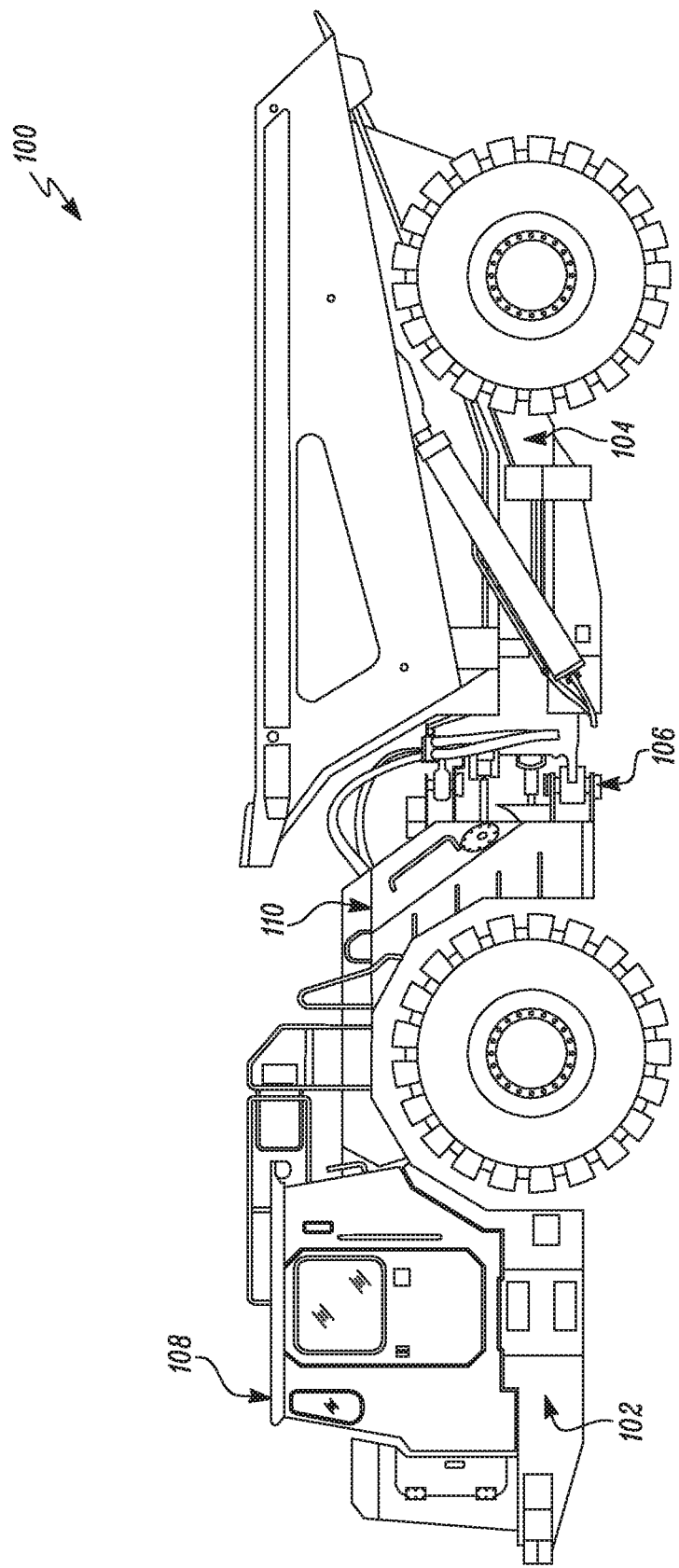
FIG. 1 is a side view of an exemplary work machine showing a platform, according to an embodiment of the present disclosure.

Wherever possible, the same reference numbers will be used throughout the drawings to refer to the same or the like parts. Referring to FIG. 1, an exemplary work machine 100 is illustrated in accordance to an embodiment of the present disclosure. As shown, the work machine 100 is exemplarily embodied as earthmoving machine i.e., an underground mining truck. However, embodiments disclosed herein are not limited to a type of work machine used. Rather, other types of work machines, including but not limited to, mobile and/or stationary vehicles or earthmoving machines, for example, pavers, cranes, excavators, and other types of mining trucks may be used as the work machine 100 in lieu of the underground mining truck disclosed herein to realize embodiments of the present disclosure. For purposes of simplicity in understanding the present disclosure, the work machine 100 will hereinafter be referred to as 'the vehicle 100'.

As shown in FIG. 1, the vehicle 100 includes a front frame 102 and a rear frame 104 that are coupled by an articulation joint 106. The front frame 102 may be adapted to support various components of the vehicle 100 thereon. For instance, the front frame 102 is configured to support an operator cabin 108. Further, the vehicle 100 also includes a platform 110 disposed rearwardly of the operator cabin 108. The platform 110 is also configured to support various machine components 112 as will be described herein.

Figure 2:
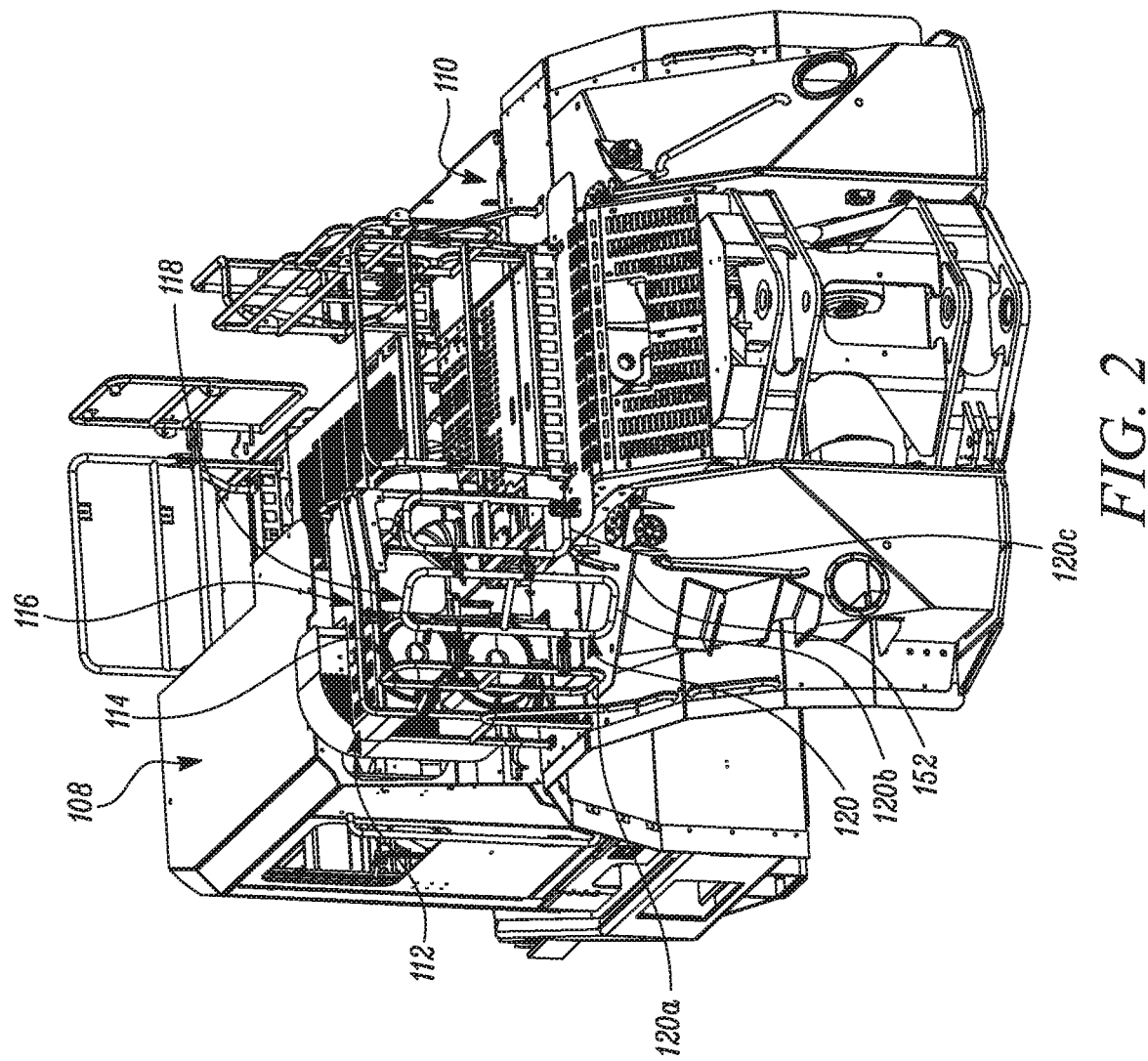
FIG. 2 is a rear perspective view of the platform showing a handrail and a machine component located onboard the platform, and a foldable guardrail assembly in its fully unfolded state, according to an embodiment of the present disclosure.

As shown in the view of FIG. 2, various machine components 112 may be disposed on the platform 110. One such machine component 112 may include, for example, an air filter 114 that may be associated with an engine (not shown) of the vehicle 100. It may be noted that although the air filter 114 is shown in the view of FIG. 2, the air filter 114 is but, only, one type of machine component that is located on the platform 110 of the vehicle 100. On the platform 110 of the disclosed vehicle 100, or on platforms of other work machines, various other types of mechanical, optical, electrical and/or hydraulic components, for example, lights, fans, pumps, compressors may be located. Accordingly, it will be acknowledged by persons skilled in the art that in this disclosure, the use of the terms 'the air filter 114' and 'the machine component 112' has been made broadly. For sake of simplicity in understanding this disclosure, it should be noted that wherever the terms 'the air filter 114' or 'the machine component 112' have been used, such terms should be understood as being merely explanatory in nature and hence, non-limiting of this disclosure.

Further, the platform 110 is provided with a handrail 116 disposed thereon. As shown, the handrail 116 is embodied as a singular L-shaped handrail. Although present disclosure discloses the L-shaped handrail, the present disclosure is not limited thereto. In other embodiments, other shapes and/or configurations of structural members, having one or more pieces therein, may be used to form the handrail 116 disclosed herein.

As shown, the handrail 116 is located adjacent to the machine component 112 and rigidly affixed to the platform 110, for example, by welding, bolting, or any other method commonly known to persons skilled in the art. Furthermore, the vehicle 100 also includes a foldable guardrail assembly 118 that is coupled to the handrail 116, explanation to which will appended herein in conjunction with FIGS. 2 through 6 of the accompanying drawings.

Figure 3:
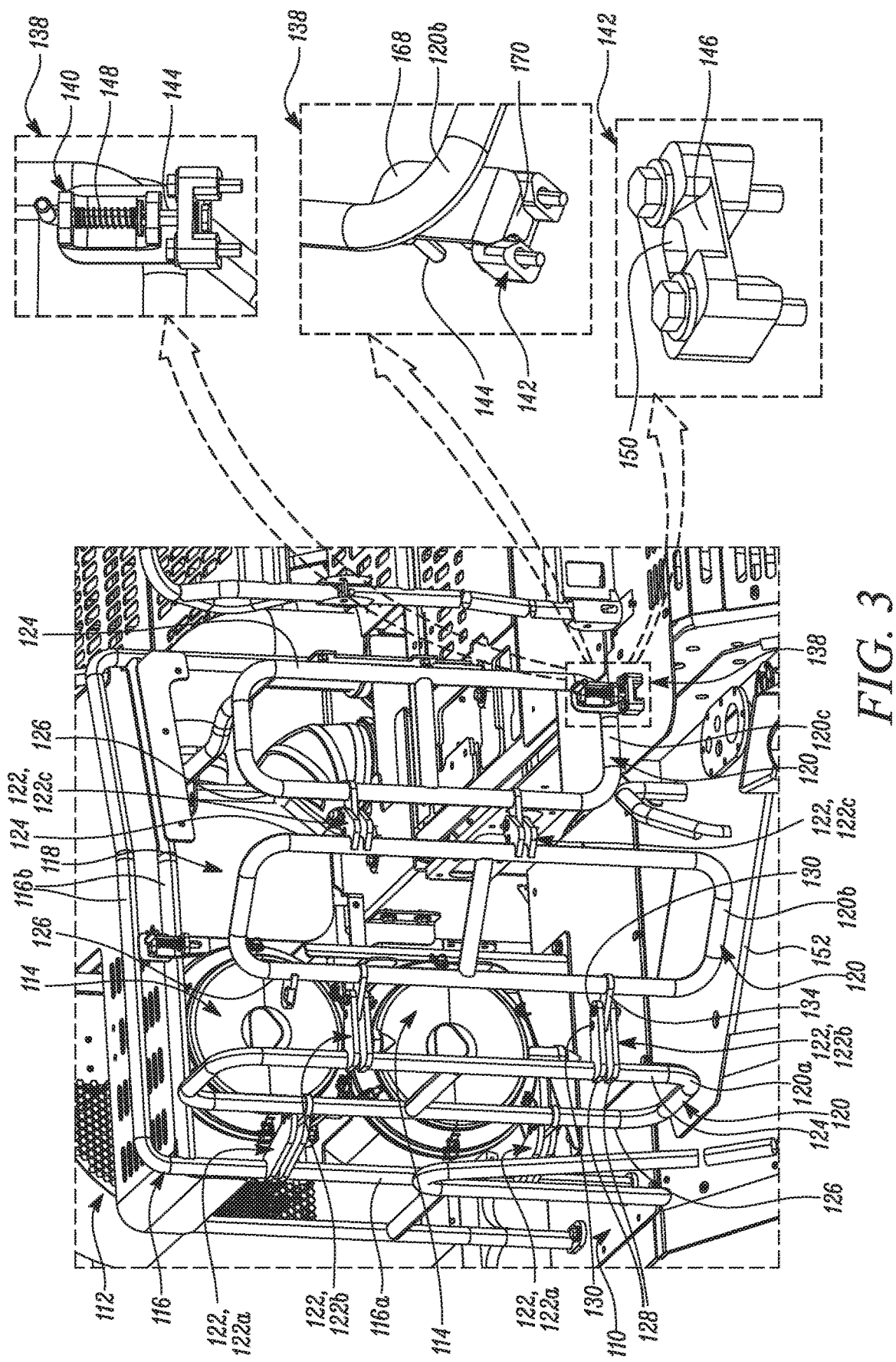
FIG. 3 is a zoomed-in rear perspective view of the platform showing a set of guardrails of the foldable guardrail assembly from the view of FIG. 2 and a series of secondarily zoomed-in front, rear and bottom perspective views of a first latch assembly used to releasably secure the set of guardrails to the platform.
Figure 4:
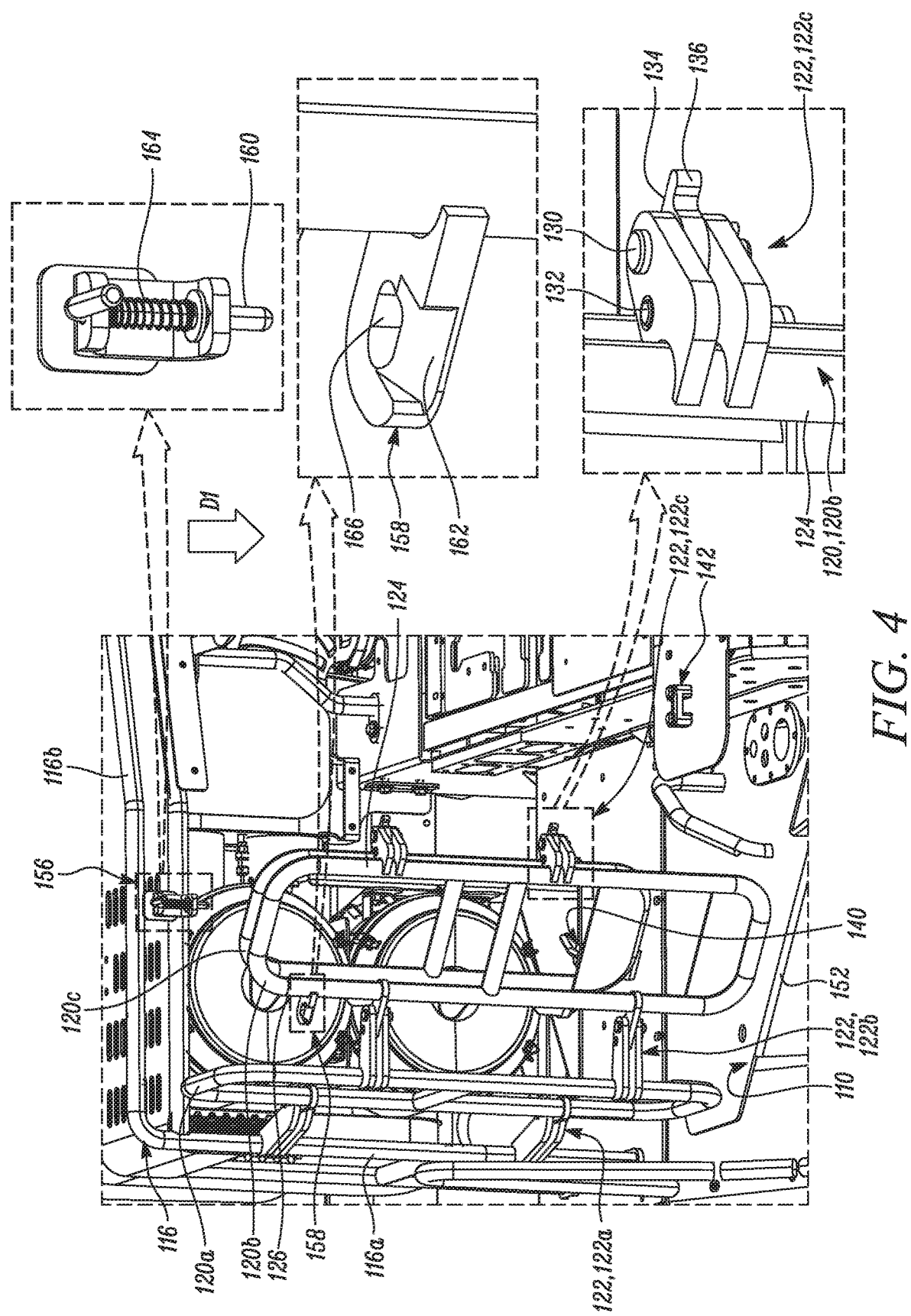
FIG. 4 is a zoomed-in rear perspective view of the platform showing the set of guardrails in a first partially folded state, a series of secondarily zoomed-in rear perspective views of a hinge assembly and a second latch assembly used to releasably secure the set of guardrails to the handrail, according to an embodiment of the present disclosure.
Figure 5:
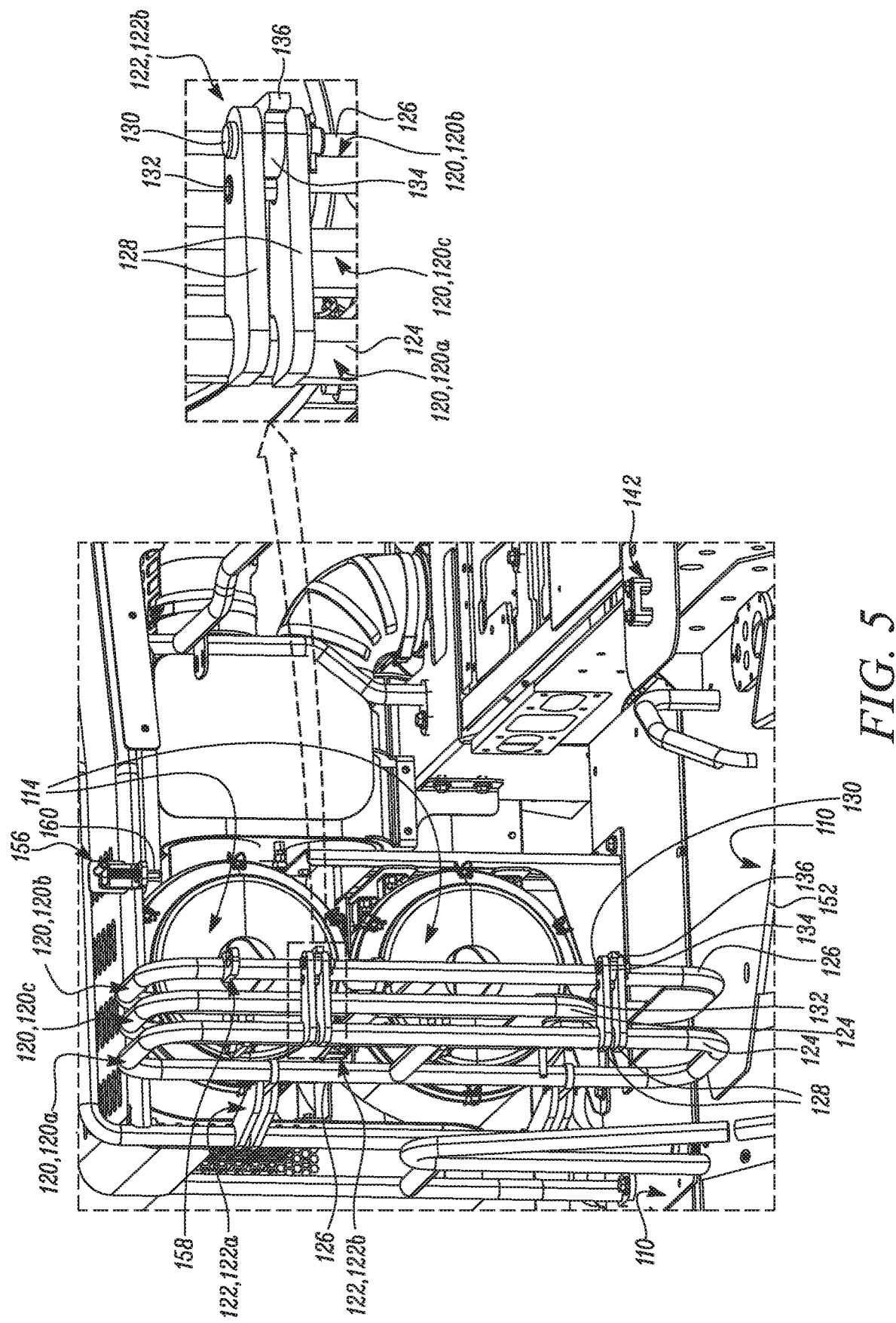
FIG. 5 is a zoomed-in rear perspective view of the platform showing the set of guardrails of the foldable guardrail assembly in a second partially folded state and a secondarily zoomed-in rear perspective views of the hinge assembly.
Figure 6:
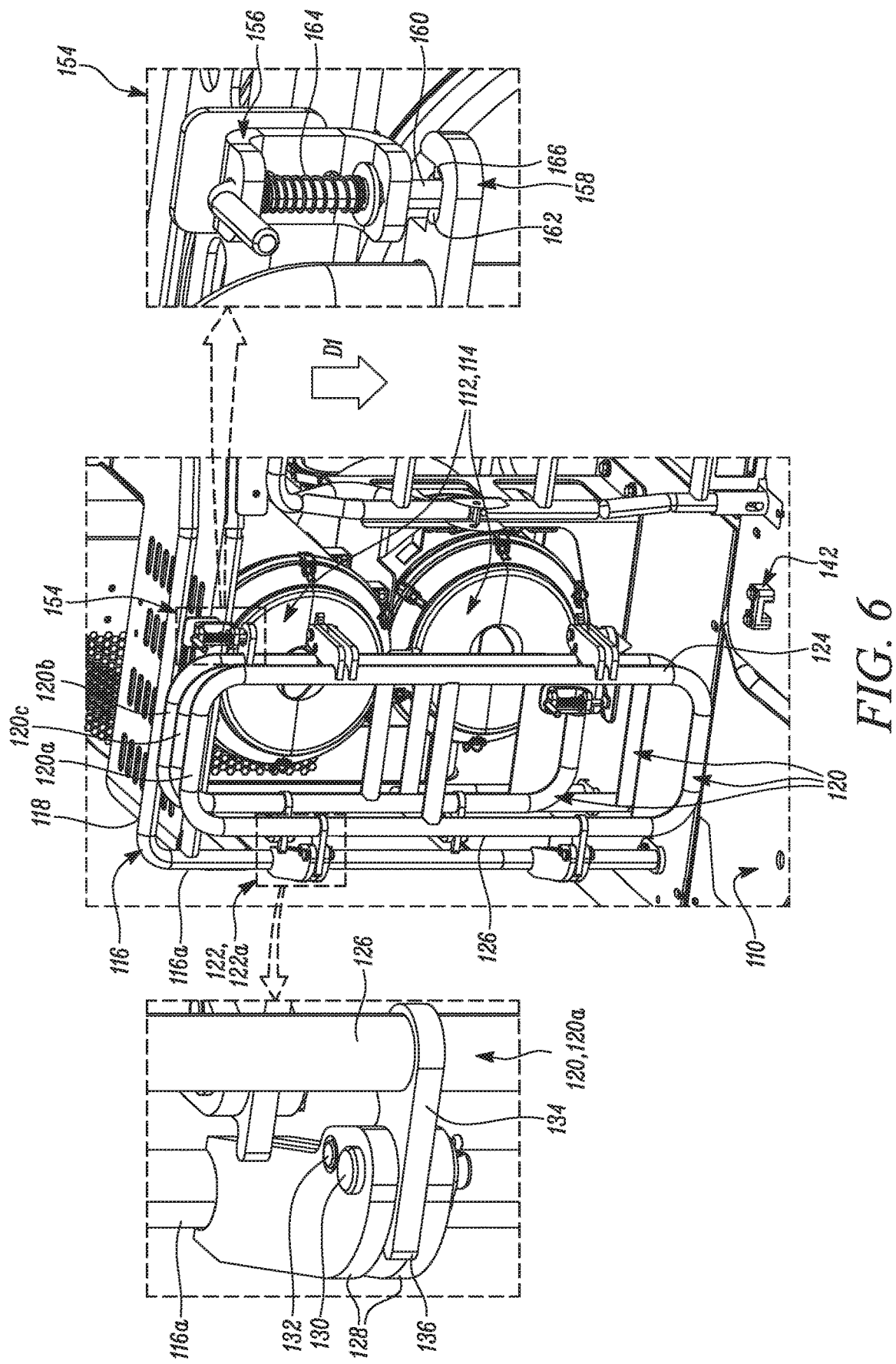
FIG. 6 is a zoomed-in rear perspective view of the platform showing the set of guardrails of the foldable guardrail assembly in a fully folded state and releasably secured to the handrail via the second latch assembly.

FIG. 3 shows the foldable guardrail assembly 118 in a fully unfolded state. FIG. 4 shows the foldable guardrail assembly 118 in a first partially folded state. FIG. 5 shows the foldable guardrail assembly 118 in a second partially folded state and FIG. 6 shows the foldable guardrail assembly 118 in a fully folded state. Referring to FIGS. 3-6, the foldable guardrail assembly 118 is operable to selectively facilitate access to the machine component 112, for example, the air filter 114. As shown best in the view of FIG. 3, the guardrail assembly 118 includes a set of guardrails 120. As shown in the illustrated embodiment of FIG. 3, the guardrail assembly 118 includes three guardrails 120a, 120b, 120c. Although three guardrails 120a, 120b, 120c are disclosed herein, in other embodiments, fewer, for example, two or more guardrails may be used in lieu of the three guardrails 120a, 120b, 120c disclosed herein. Therefore, it may be noted that a number of guardrails 120 is non-limiting to this disclosure. The present disclosure will be explained hereinafter in conjunction with the three guardrails 120a, 120b, 120c disclosed in the views of FIGS. 2-6.

Further, these guardrails 120a, 120b, 120c are pivotally connected to each other in a successive manner via at least a corresponding number of hinge assemblies 122. As shown best in the illustrated embodiment of FIG. 3, the three guardrails 120a, 120b, 120c of the guardrail assembly 118 are pivotally connected in a successive manner via six hinge assemblies 122. These hinge assemblies 122 are provided, in part, on an upright portion 116a of the handrail 116 and a first opposing side 124 of each, but the last, guardrail i.e., the guardrails 120a, 120b, located distal from the upright portion 116a of the handrail 116. A first one of the guardrails 120a is pivotally connected to the upright portion 116a of the handrail 116 via a pair of first hinge assemblies 122a. A second one of the guardrails 120b is pivotally connected to the first one of the guardrails 120a via a pair of second hinge assemblies 122b. A third one of the guardrails 120c is pivotally connected to the second one of the guardrails 120b via a pair of third hinge assemblies 122c.

Although six hinge assemblies 122 i.e., three pairs of hinge assemblies 122a, 122b, 122c are disclosed herein, in other embodiments, fewer or more hinge assemblies 122 may be used to successively and pivotally connect the set of adjacently located guardrails 120a, 120b, 120c. In an example, in the illustrated embodiment of FIG. 3, three hinge assemblies 122a, 122b, 122c—one between the upright portion 116a of the handrail 116 and the first one of the guardrails 120a and one between each pair of adjacently located guardrails 120a, 120b and 120b, 120c may be used in lieu of the six hinge assemblies 122 disclosed herein. Therefore, it may be noted that a number of hinge assemblies 122 used is non-limiting of this disclosure.

Further, in an embodiment as shown best in the views of FIGS. 4 and 5, each hinge assembly 122a, 122b, 122c may, in part, include a pair of supporting hinge plates 128, a hinge pin 130, and a stop member 132. The pair of supporting hinge plates 128 are disposed in a spaced-apart manner. The hinge pin 130 extends between the pair of supporting hinge plates 128. The stop member 132 is located away from the hinge pin 130 and extends between the pair of supporting hinge plates 128. Furthermore, in this embodiment, each hinge assembly 122a, 122b, 122c is also provided, in part, on a second opposing side 126 of each guardrail 120a, 120b, 120c proximal to the upright portion 116a of the handrail 116. As shown best in the views of FIGS. 4 and 5, each hinge assembly 122a, 122b, 122c may further include a rotatable hinge plate 134 pivotally coupled to the pair of supporting hinge plates 128 that is associated with a preceding one of the guardrails 120 via the hinge pin 130. Furthermore, the stop member 132 and a free end 136 of each rotatable hinge plate 134, extending past the hinge pin 130, may together be configured to serve as a limit for angular movement of at least one adjacently located guardrail 120 i.e., when the free end 136 of each rotatable hinge plate 134 contacts with the stop member 132.

The guardrail assembly 118 also includes a first latch assembly 138. As shown best in the zoomed-in views of FIG. 3, the first latch assembly 138 is provided, at least in part, on a last one of the guardrails 120 i.e., the third one of the guardrails 120c. The first latch assembly 138 is configured to releasably secure the last one of guardrails 120 i.e., the third one of the guardrails 120c to the platform 110 when the guardrails 120 operably move into a fully unfolded position (as shown in the view of FIG. 3), via the hinge assemblies 122a, 122b, and 122c. By securing the last one of the guardrails 120 i.e., the third one of the guardrails 120c to the platform 110, the set of guardrails 120 i.e., the guardrails 120a, 120b, 120c are secured in position for providing access to the machine component 112, for example, the air filter 114 located onboard the platform 110.

In an embodiment as best shown in the view of FIG. 3, the first latch assembly 138 includes, in part, a first latch 140 affixed, for example, by welds (not shown) to the last one of the guardrails 120 i.e., the third one of the guardrails 120c. The first latch 140 may be configured to releasably engage with a first detent member 142 that may, in one embodiment herein, form another part of the first latch assembly 138. As shown in the illustrated embodiment of FIG. 3, the first detent member 142 may be affixed, for example, by welds (not shown) to the platform 110 at a location distal from the handrail 116.

Further, as shown in the illustrated embodiment of FIG. 3, the first latch 140 may be configured as a spring-loaded latch pin 144 that may be biased in a first direction D1, for example, downwards. Moreover, the first detent member 142 may be configured to define a beveled guide slot 146 that may be configured to move the latch pin 144 of the first latch 140 against the force of the associated spring 148 and a receptacle 150 that is located overlappingly with the beveled guide slot 146 and extending in the first direction D1, the same direction as the bias of the latch pin's spring-force. In this embodiment, the receptacle 150 of the first detent member 142 may also be configured i.e., sized and/or shaped to receive the spring-loaded latch pin 144 of the first latch 140 therein when the guardrails 120a, 120b, 120c are disposed in the fully unfolded position.

Furthermore, in an embodiment as best shown in the view of FIG. 3, the first latch 140 may be provided with a backing plate 168. The backing plate 168 may be configured to depend downwardly and extend laterally to define a tongue 170. When the guardrails 120a, 120b, 120c are secured in the fully unfolded position i.e., upon engagement of the first latch 140 and the first detent member 142, the tongue 170 would be positioned beneath the beveled guide slot 146 of the second detent member 142 i.e., between the beveled guide slot 146 of the second detent member 142 and the platform 110. Although the spring-loaded latch pin 144 of the first latch 140 would secure the guardrails 120 in the fully unfolded position upon engagement with the receptacle 150 of the first detent member 142, the tongue 170 may be additionally provided for preventing any inadvertent movement of the guardrails 120 in a direction opposite to that of direction D1 which would otherwise disengage the latch pin 144 of the first latch 140 with the receptacle 150 of the first detent member 142.

Although the first detent member 142 is disclosed herein, in an alternative embodiment, the first detent member 142 may be omitted altogether and replaced by a receptacle (not shown) defined directly on the platform 110 itself. Additionally, or optionally, the platform 110 may directly be configured to define a gradient (akin to the beveled guide slot 146) protruding from the platform 110. Such a configuration of the gradient and the receptacle may be contemplated for implementation and use directly on the platform 110, in lieu of the first detent member 142 disclosed herein, for securing the set of guardrails 120 i.e., the guardrails 120a, 120b, 120c to the platform 110. Therefore, it should be noted that provision of the first detent member 142, although not absolutely necessary, is merely illustrative in nature and hence, non-limiting of this disclosure. Other structural configurations may be contemplated in lieu of the first detent member 142, by persons skilled in the art, without limiting the scope of the appended claims.

In embodiments herein, it is further contemplated that the free ends 136 of the rotatable hinge plates 134 and the stop members 132 from respective ones of the hinge assemblies 122 would limit any further unfolding of the guardrails 120a, 120b, 120c outwards of a volume of the vehicle 100 such that in the fully unfolded position of the guardrails 120a, 120b, 120c, the first latch assembly 138 operatively and releasably secures the set of guardrails 120 to the platform 110. That is, in the fully unfolded position of the guardrails 120, each of the guardrails 120a, 120b, 120c would be positioned to preferably conform i.e., be disposed in line with an edge 152 of the platform 110 such that a maximum amount of space would be available on the platform 110 for facilitating service personnel, located onboard the vehicle 100, to not only access but also to perform one or more operations that may be needed on the machine component 112, for example—removal of a used air filter 114 and replacement of the used air filter 114 with another air filter 114, without falling off the platform 110 whilst having the required amount of space on the platform 110 to accommodate the removed/the other air filter 114.

Further, in an embodiment as shown best in the views of FIGS. 4 and 6, the guardrail assembly 118 further includes a second latch assembly 154 that is, at least in part, provided on a pre-selected one of the guardrails. In the embodiment shown in FIGS. 3, 4, and 6, the pre-selected one of the guardrails is the second one of the guardrails 120b. However, in other embodiments, the pre-selected one of the guardrails may include other guardrails 120 i.e., the first or third one of the guardrails 120a/120c depending on specific requirements of an application, for example, one or more spatial constraints encountered on a given type of vehicle 100 and/or based on constraints due to a shape, size, and/or configuration of each of the guardrails 120a, 120b, 120c.

The second latch assembly 154 may include, in part, a second latch 156 affixed to the handrail 116 and located distally away from the upright portion 116a of the handrail 116 as shown best in the views of FIGS. 3, 4 and 6. That is, the second latch 156 may be affixed, for example, by welds (not shown) to a portion 116b of the handrail 116 that extends laterally from the upright portion 116a of the handrail 116. The second latch 156 may be configured to releasably engage with a second detent member 158, that in one embodiment may form another part of the second latch assembly 154. The second detent member 158 may be affixed to a side i.e., the first or second opposing sides 124/126 of the pre-selected one of the guardrails i.e., the guardrail 120b at a location distal from the first hinge assembly 122a. As shown best in the in the illustrated embodiment of FIGS. 3, 4 and 6, the second detent member 158 is affixed, for example, by welds (not shown) to the second opposing side 126 of the second one of the guardrails 120 i.e., the guardrail 120b.

Further, in an embodiment as shown best in the views of FIGS. 4 and 6, the second latch 156 may be configured to have a spring-loaded latch pin 160 that may be biased in the first direction D1, for example, downwards. Moreover, the second detent member 158 may be configured to define a beveled guide slot 162 that may be configured to move the latch pin 160 of the second latch 156 against the force of the associated spring 164. The second detent member 158 may also be configured to define a receptacle 166 that is overlappingly located with the beveled guide slot 162 of the second detent member 158 and extending in the first direction D1, that is, the same direction as the bias of the latch pin's spring-force. In this embodiment, the receptacle 166 of the second detent member 158 may also be configured i.e., sized and/or shaped to receive the spring-loaded latch pin 160 of the second latch 156 therein when the guardrails 120a, 120b, 120c are disposed in the fully folded position.

In embodiments herein, the guardrails 120a, 120b, 120c are configured to prevent access to the machine component 112, for example, the air filter 114 when disposed in the fully folded position and the second latch 156 is releasably engaged with the second detent member 158. Further, in the second partially folded position, as depicted in the view of FIG. 5, although the guardrails 120a, 120b, 120c are shown folded in a reverse order (i.e., starting from the last guardrail 120c to the first guardrail 120a) and rendered into a stacked configuration, the guardrail assembly 118 in this second partially folded position would also continue to prevent access and/or performance of certain operations, for example, the removal of the air filter 114. For purposes of this disclosure, it should be noted that due to the relative sizing and/or positioning of the components i.e., the air filter 114, the handrail 116, and the individual guardrails 120a, 120b, 120c, the second partially folded state of the guardrails 120 (i.e., when the guardrail 120a remains unfolded and only the guardrails 120b and 120c are folded) as depicted in the view of FIG. 5 may be regarded as being functionally akin to the fully folded state of the guardrails 120a, 120b, 120c that is depicted in the view of FIG. 6.

Moreover, with implementation of embodiments herein, it is envisioned that if the guardrails 120 have inadvertently been left unsecured in position i.e., unlatched from both of the fully unfolded and fully folded states, the individual guardrails 120a, 120b, 120c would be set into a folding or unfolding motion, for instance, when an operator steers the vehicle 100, or when a force of gravity acts on the individual guardrails 120a, 120b, 120c hinged at their respective hinge assemblies 122a, 122b, 122c. This folding or unfolding motion, determined by the free ends 136 of the rotatable hinge plates 134 and the stop members 132 of respective ones of the hinge assemblies 122, could help move, for example, the latch pin 144 of the first latch 140 against the beveled guide slot 146 of the first detent member 142. It is hereby also contemplated that the spring force of at least one of the latch assemblies, for example, the first latch assembly 138 and an angle of the beveled guide slot 146 could be optimized so that the naturally unfolding motion of the guardrails 120a, 120b, 120c would suffice in overcoming the bias of the spring 148 and facilitate engagement of, for example, the latch pin 144 of the first latch 140 member with the receptacle 150 of the first detent member 142 i.e., until the latch pin 144 of the first latch 140 member is received within the receptacle 150 of the first detent member 142.

It should be noted that although the second latch assembly 154 is disclosed by way of the forgoing embodiments, providing the second latch assembly 154 partially, or even in its entirety, may not be necessary. Persons skilled in the art will acknowledge that one or more modifications may be possible to the configuration of the guardrail assembly 118 disclosed herein. For instance, in a first modified configuration, the second latch 156 may be omitted, and only the second detent member 158 may be used. However, in this modified configuration i.e., the first modified configuration, the second detent member 158 may be positioned on the platform 110, in lieu of the pre-selected one of the guardrails 120 such that the first latch 140 may co-operate with this repositioned second detent member 158 for securing the guardrails 120 when in the fully folded position. In a second modified configuration, the second latch assembly 154 i.e., the second latch 156 and the second detent member 158 may altogether be omitted, and a receptacle (not shown) may be defined directly on the platform 110, instead of repositioning the second detent member 158—as disclosed in the first modified configuration. Additionally, or optionally, the platform 110 may also be configured to define another gradient (not shown) protruding therefrom. This gradient could be akin to the beveled guide slot 162 of the second detent member 158 and located adjacent such a receptacle. This gradient and receptacle arrangement may be contemplated for implementation and use directly on the platform 110, in lieu of the second latch assembly 154 disclosed herein. Accordingly, in this modified configuration i.e., the second modified configuration, the first latch 140 may co-operate with the receptacle defined on the platform 110 for securing the set of guardrails 120 i.e., the guardrails 120a, 120b, 120c to the platform 110 when in the fully folded position.

INDUSTRIAL APPLICABILITY

The present disclosure has applicability for use in selectively facilitating access to a machine component located onboard a platform of a vehicle. With use of present disclosure, manufacturers of vehicles such as, but not limited to, earthmoving machines could provide the guardrail assembly 118 disclosed herein as a standard fitment, or a retrofit option to existing vehicles for enhancing safety of personnel onboard the platform of such vehicles.

The set of guardrails 120 i.e., the guardrails 120a, 120b, and 120c disclosed herein may be manufactured from readily available and light-weight yet sturdy materials known to persons skilled in the art. The foldable guardrail assembly 118 therefore offers a sturdy, compact, and cost-effective means to enhancing safety of personnel onboard the platforms of vehicles. With implementation of embodiments disclosed herein, personnel may now be prompted to test their intuitiveness before accessing, or stated differently— before removing certain machine components 112, for example—the air filter/s 114 that are located proximal to the edge 152 of the platform 110, when the guardrail assembly 118 is secured in the fully folded position by the second latch assembly 154. When implemented for use on the platform 110 of a vehicle 100, the guardrail assembly 118 of the present disclosure may urge maintenance personnel to ensure safety before commencing any operation pertaining to service routines on the machine component 112 i.e., by forcing the maintenance personnel to unlatch the second latch assembly 154 and securing the set of guardrails 120 in a 'maintenance' position i.e., by moving the guardrails 120a, 120b, 120c such that the first latch 140 member is moved against the first detent member 142 until the latch pin 144 of the first latch 140 member is received within the receptacle 150 of the first detent member 142.

All directional references (e.g., upward, downward, top, bottom, rear, front, upright) are only used for identification purposes to aid the reader's understanding of the present disclosure, and may not create limitations, particularly as to the position, orientation, or use of the components and/or assemblies disclosed herein. Joinder references (e.g., affixed attached, coupled, connected, hinged, and the like) are to be construed broadly and may include intermediate members between a connection of components and relative movement between components. As such, joiner references do not necessarily infer that two segments are directly connected and in fixed relation to each other.

Additionally, all numerical terms, such as, but not limited to, "first", "second", "third", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

Similarly, adjectives such as, but not limited to, "articulated", "modified", or similar, should be construed broadly, and only as nominal, and may not create any limitations, not create any limitations, particularly as to the description, operation, or use unless specifically set forth in the claims.

While aspects of the present disclosure have been particularly shown and described with reference to the embodiments above, it will be understood by those skilled in the art that various additional embodiments may be contemplated by the modification of the disclosed guardrail assembly 118 or the vehicle 100 without departing from the spirit and scope of the disclosure. Such embodiments should be understood to fall within the scope of the present disclosure as determined based upon the claims and any equivalents thereof.

What is claimed is:

1. A foldable guardrail assembly for selectively facilitating access to a machine component located onboard a platform of a work machine, the platform being provided with a handrail thereon and located adjacent to the machine component, the guardrail assembly comprising:
   a set of guardrails pivotally connected to each other in a successive manner via at least a corresponding number of hinge assemblies, wherein a first one of the guardrails is pivotally connected to an upright portion of the handrail via a first hinge assembly; and
   a first latch assembly provided, at least in part, on a last one of the guardrails, the first latch assembly configured to releasably secure the last one of guardrails to the platform when the guardrails operably move into in a fully unfolded position, via the hinge assemblies, for providing access to the machine component located onboard the platform;
   wherein the hinge assemblies are provided, in part, on the upright portion of the handrail and a first opposing side of each, but the last, guardrail distal from the upright portion of the handrail, and wherein each hinge assembly includes:
      a pair of supporting hinge plates disposed in a spaced-apart manner;
      a hinge pin extending between the pair of supporting hinge plates; and
      a stop member located away from the hinge pin and extending between the pair of hinge plates.

2. The foldable guardrail assembly of claim 1, wherein the first latch assembly includes, in part, a first latch affixed to the last one of the guardrails.

3. The foldable guardrail assembly of claim 2, wherein the first latch is configured to releasably engage with a first detent member forming another part of the first latch assembly, and wherein the first detent member is affixed to the platform at a location distal from the handrail.

4. The foldable guardrail assembly of claim 3, wherein the first latch is configured as a spring-loaded latch pin biased in a first direction.

5. The foldable guardrail assembly of claim 4, wherein the first detent member defines a beveled guide slot configured to move the latch pin against the force of the spring, and a receptacle located overlappingly with the beveled guide slot and extending in the first direction, and wherein the receptacle is configured to receive the spring-loaded latch pin of the first latch therein when the guardrails are disposed in the fully unfolded position.

6. The foldable guardrail assembly of claim 1, wherein each hinge assembly provided, in part, on a second opposing side of each guardrail, proximal to the upright portion of the handrail, includes a rotatable hinge plate pivotally coupled to the pair of supporting hinge plates associated with a preceding one of the guardrails via the hinge pin.

7. The foldable guardrail assembly of claim 6, wherein the stop member and a free end of each rotatable hinge plate, extending past the hinge pin, are together configured to serve as a limit for angular movement of at least one adjacently located guardrail when the free end of each rotatable hinge plate contacts with the stop member.

8. The foldable guardrail assembly of claim 1, wherein the guardrails are configured to prevent access to the machine component when disposed in a fully folded position.

9. The foldable guardrail assembly of claim 8 further comprising a second latch assembly provided, at least in part, on a pre-selected one of the guardrails for securing the guardrails in the fully folded position.

10. The foldable guardrail assembly of claim 9, wherein the second latch assembly includes, in part, a second latch affixed to the handrail and located distally away from the upright portion of the handrail.

11. The foldable guardrail assembly of claim 10, wherein the second latch is configured to releasably engage with a second detent member, forming another part of the second latch assembly and, affixed to a side of the pre-selected one of the guardrails at a location distal from the first hinge assembly.

12. The foldable guardrail assembly of claim 11, wherein the second latch is configured as a spring-loaded latch pin biased in a first direction, and wherein the second detent member defines a beveled guide slot configured to move the latch pin of the second latch against the force of the spring, and a receptacle located overlappingly with the beveled guide slot and extending in the first direction, and wherein the receptacle is configured to receive the spring-loaded latch pin of the second latch therein when the guardrails are disposed in the fully folded position.

13. A work machine comprising:
a platform;
a machine component located onboard the platform;
a handrail disposed on the platform and located adjacent to the machine component;
a foldable guardrail assembly coupled to the handrail, the foldable guardrail assembly operable to selectively facilitate access to the machine component, the foldable guardrail assembly comprising:
a set of guardrails pivotally connected to each other in a successive manner via at least a corresponding number of hinge assemblies, wherein a first one of the guardrails is pivotally connected to an upright portion of the handrail via a first hinge assembly;
a first latch assembly provided, at least in part, on a last one of the guardrails, the first latch assembly configured to releasably secure the last one of guardrails to the platform when the guardrails operably move into in a fully unfolded position, via the hinge assemblies, for providing access to the machine component located onboard the platform; and
a second latch assembly provided, at least in part, on a pre-selected one of the guardrails, the second latch assembly configured to releasably secure the guardrails to the handrail when the guardrails operably move into in a fully folded position, via the hinge assemblies, for preventing access to the machine component located onboard the platform;
wherein the hinge assemblies are provided, in part, on the upright portion of the handrail and a first opposing side of each, but the last, guardrail distal from the upright portion of the handrail, and wherein each hinge assembly includes:
a pair of supporting hinge plates disposed in a spaced-apart manner;
a hinge pin extending between the pair of supporting hinge plates; and
a stop member located away from the hinge pin and extending between the pair of hinge plates.

14. The work machine of claim 13, wherein the first latch assembly includes, in part, a first latch affixed to the last one of the guardrails, and wherein the first latch is configured to releasably engage with a first detent member forming another part of the first latch assembly, the first detent member affixed to the platform at a location distal from the handrail.

15. The work machine of claim 14, wherein the first latch is configured as a spring-loaded latch pin biased in a first direction.

16. The work machine of claim 15, wherein the first detent member defines a beveled guide slot configured to move the latch pin against the force of the spring, and a receptacle located overlappingly with the beveled guide slot and extending in the first direction, and wherein the receptacle is configured to receive the spring-loaded latch pin of the first latch therein when the guardrails are disposed in the fully unfolded position.

17. The work machine of claim 13, wherein the hinge assemblies are provided, in part, on a second opposing side of each guardrail located proximal to the upright portion of the handrail, and wherein each hinge assembly includes a rotatable hinge plate pivotally coupled to the pair of supporting hinge plates associated with a preceding one of the guardrails via the hinge pin.

18. The work machine of claim 17, wherein the stop member and a free end of each rotatable hinge plate, extending past the hinge pin, are together configured to serve as a limit for angular movement of at least one adjacently located guardrail when a free end of each rotatable hinge plate, extending past the hinge pin, contacts with the stop member.

19. A foldable guardrail assembly for selectively facilitating access to a machine component located onboard a platform of a work machine, the platform being provided with a handrail thereon and located adjacent to the machine component, the guardrail assembly comprising:
a set of guardrails pivotally connected to each other in a successive manner via at least a corresponding number of hinge assemblies, wherein a first one of the guardrails is pivotally connected to an upright portion of the handrail via a first hinge assembly; and
a first latch assembly provided, at least in part, on a last one of the guardrails, the first latch assembly configured to releasably secure the last one of guardrails to the platform when the guardrails operably move into in a fully unfolded position, via the hinge assemblies, for providing access to the machine component located onboard the platform;
wherein the first latch assembly includes, in part, a first latch affixed to the last one of the guardrails;
wherein the first latch is configured to releasably engage with a first detent member forming another part of the first latch assembly, and wherein the first detent member is affixed to the platform at a location distal from the handrail;
wherein the first latch is configured as a spring-loaded latch pin biased in a first direction; and
wherein the first detent member defines a beveled guide slot configured to move the latch pin against the force of the spring, and a receptacle located overlappingly with the beveled guide slot and extending in the first direction, and wherein the receptacle is configured to receive the spring-loaded latch pin of the first latch therein when the guardrails are disposed in the fully unfolded position.

* * * * *